United States Patent
Jafri et al.

(10) Patent No.: US 12,126,612 B2
(45) Date of Patent: Oct. 22, 2024

(54) USER AUTHENTICATION VIA TELEPHONIC COMMUNICATION

(71) Applicant: Uber Technologies, Inc., San Francisco, CA (US)

(72) Inventors: Danish Jafri, Bangalore (IN); Kartik Sura, Bangalore (IN)

(73) Assignee: UBER TECHNOLOGIES, INC., San Francisco, CA (US)

( * ) Notice: Subject to any disclaimer, the term of this patent is extended or adjusted under 35 U.S.C. 154(b) by 667 days.

(21) Appl. No.: 17/343,951

(22) Filed: Jun. 10, 2021

(65) Prior Publication Data

US 2022/0400103 A1    Dec. 15, 2022

(51) Int. Cl.
*G06F 21/44*  (2013.01)
*H04L 9/32*   (2006.01)
*H04L 9/40*   (2022.01)

(52) U.S. Cl.
CPC .......... *H04L 63/083* (2013.01); *G06F 21/44* (2013.01); *H04L 9/3236* (2013.01); *G06F 2221/2111* (2013.01)

(58) Field of Classification Search
CPC ............ H04L 63/083; H04L 63/0838; H04L 63/0846; H04L 9/3236; G06F 21/44; G06F 21/316; G06F 2221/2111
See application file for complete search history.

(56) References Cited

U.S. PATENT DOCUMENTS

| | | | |
|---|---|---|---|
| 2021/0014224 A1* | 1/2021 | Gordon | H04L 63/102 |
| 2021/0135869 A1* | 5/2021 | Barhudarian | G06F 21/62 |
| 2021/0377389 A1* | 12/2021 | Combellas | H04M 3/4365 |
| 2023/0062507 A1* | 3/2023 | Aabye | H04L 9/3271 |

* cited by examiner

*Primary Examiner* — Nelson S. Giddins
(74) *Attorney, Agent, or Firm* — Dority & Manning, P.A.

(57) ABSTRACT

Examples of the present disclosure describe systems and methods for automated user authentication via phone call. In aspects, user interaction with an application/service may be detected at a user device. Device information for the user device may be provided to a login management service, which may provide access information and a security object for accessing the application/service to the user device. The user device may use the access information to place a call to a service provider. A call detection service may detect the call and collect contact information for the user device and the security object. The contact information and the security object may be provided to the login management service. The login management service may validate the security object and use the contact information to authenticate a user to access the application/service.

20 Claims, 5 Drawing Sheets

USER AUTHENTICATION VIA TELEPHONIC COMMUNICATION

BACKGROUND

Current authentication processes typically involve the creation and/or transmission of a security object, such as a security token or code. In many instances, the authentication process requires a user to manually enter data (e.g., phone number, country code, security object) into the authentication system. The manual entry of data is cumbersome to the user, which causes many users to abandon the authentication process. The manual entry of data is also prone to user error, which causes the authentication process to fail due to the entry of incorrect data. Both scenarios diminish the user experience and represent a potential loss of user business.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for automated user authentication via a telephonic communication (e.g., phone call). According to one or more examples, user interaction with an application/service may be detected at a user device and/or a system operating a network service associated with the application. A user operating the user device may be a new user of a particular application or service (e.g., a user who does not yet have an account with that application or service). As such, the user may interact with an application on his or her user device to start an authentication process as part of account creation or new user sign up. Device information for the user device may be provided to a login management service, which may provide access information for accessing the application/service to the user device. The access information may comprise a security object. The user device may use the access information to place a call to a service provider. A call detection service may detect the call and collect contact information for the user device and the security object. The call detection service may provide the contact information and the security object to the login management service. The login management service may validate the security object and use the contact information to determine whether the user or user device is registered with the application/service. If the user or user device is registered, the login management service may authenticate the user device and the user device may access the application/service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
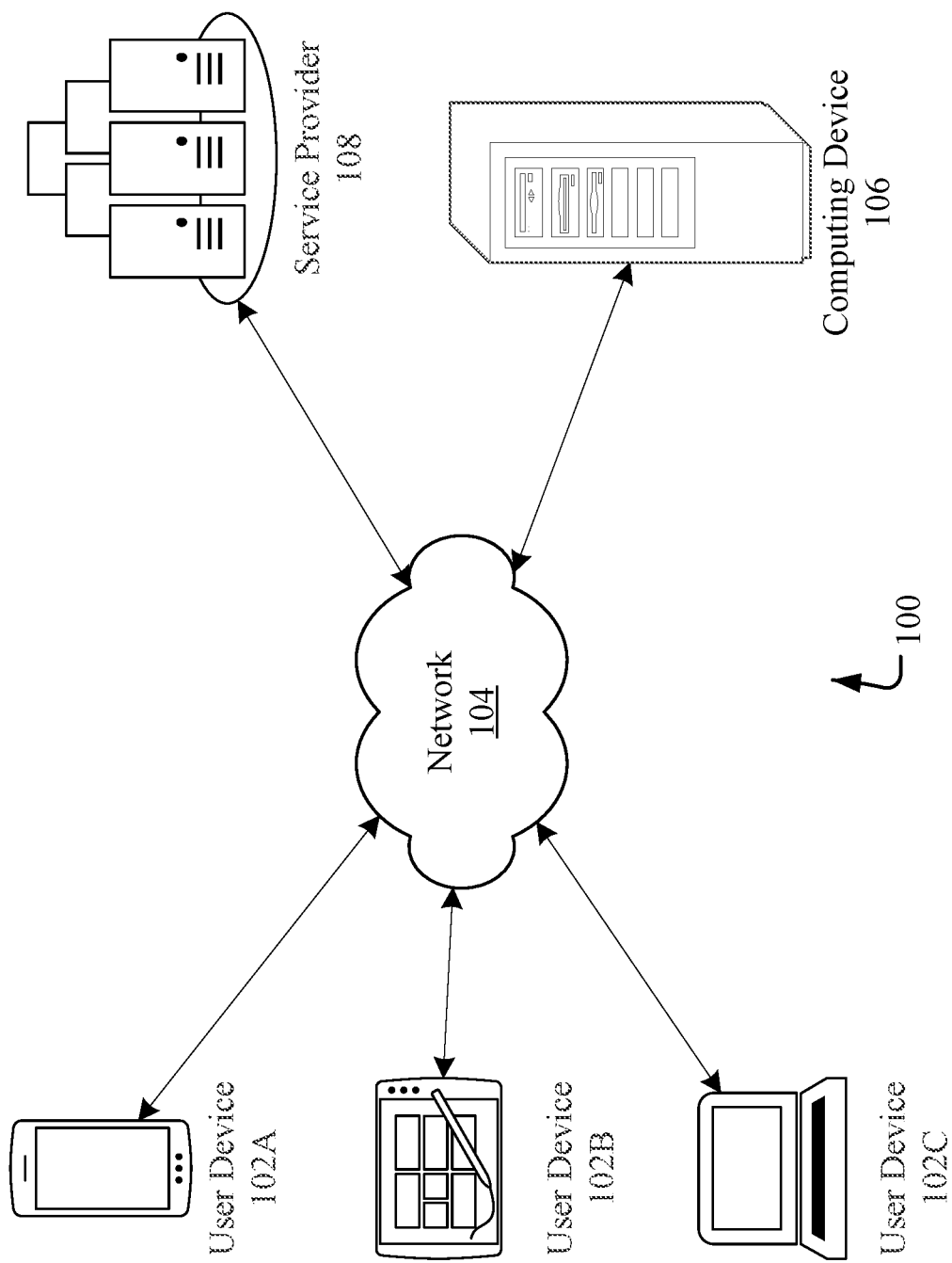
FIG. 1 illustrates an overview of an example system for automated user authentication via phone call.

Authentication is a mechanism for verifying the identify of a user or user device. Many traditional authentication systems enable a user to prove the user's identity by providing a security credential, such as a username and/or password, or other information. As a specific example, to access an application or service using a user device in a traditional authentication system, a user may be required to manually enter user information (e.g., phone number, country code, and other user and/or user device information) into a user interface of the application/service. The user interface may comprise a "submit" button or control that provides the user information to a backend environment. The user may select the button/control to transmit the user information to the backend environment for processing.

In response to receiving the user information, the backend environment may generate a security object (e.g., token or code) that is mapped to the phone number of the user device. The security object may be provided to the user using one or more communication methods, such as SMS, MMS, etc. However, such communications are subject to failure for several reasons, such as the entry of incorrect user information, variant communication protocols and encoding between software and hardware platforms, network coverage issues/restrictions, and service provider issues/restrictions. Additionally, although the cost for each individual communication may be relatively inexpensive, the aggregated cost of such communications over time may be substantial.

If the security object is successfully received, the user may be required to manually enter the security object into the user interface of the application/service. Manually entering the security object introduces another point of potential user error due to mistyping by the user. Mistyping the security object may cause the authentication process to fail and force the user to restart the authentication process (which wastes time and communication costs). Further, manually entering the security object can be cumbersome and represents yet another data entry requirement by the user. Many users are frustrated and fatigued by the communication failures and data entry requirements of such traditional authentication systems. As a result, many users opt to abandon the authentication process, which represents a loss of business and/or reputation for the application/service.

To address such traditional authentication systems, the present disclosure describes systems and methods for automated user authentication via phone call. In aspects, user interaction with an application/service may be detected at a user device. Examples of user interaction include, but are not limited to, launching/opening the application/service, accessing a particular function or portion of the application/service, interacting with the application/service for at least a predefined period of time, and user selection of a button or control of the application/service. The user interaction may cause a communication session to be initiated/established between the user device and the application/service. The communication session may be associated with a session identifier that is stored by the user device and/or the application/service. Alternatively, a session identifier may not be available when a stateful communication protocol is implemented.

Upon detecting the user interaction, device information for the user device may be provided to a login management service associated with the application/service. The device information may include a device identifier (e.g., International Mobile Equipment Identity (IMEI), Type Allocation Code (TAC), Media Access Control (MAC) address), geolocation information (e.g., country code, area code, Global National Satellite System (GNSS) coordinates, Global Positioning System (GPS) coordinates, access point information), and/or other user device information (e.g., hardware/software profile, capabilities, make/model). The login management service may generate a security object for the communication session. The security object may be mapped to the communication session and/or the device information and may be stored by the login management service. In examples, the security object may be generated randomly or generated based on the device information. The login management service may also generate or select access information for accessing the application/service. Examples of the access information may include a phone number, an Internet Protocol (IP) address, a hyperlink, and the like. The login management service may combine (e.g., append or otherwise affix) the security object to the access information and provide the access information and the security object to the user device.

Upon receiving the access information and the security object, the user device may use the access information and the security object to initiate a communication session (e.g., a phone call) with an automated communication interface. The communication interface (or a mechanism associated therewith) may extract the security object from the access information and collect contact information for the user device. Examples of the contact information may include a phone number of the user device, an IP address of the user device, one or more portions of the access information, or the like. The communication interface may provide the contact information and the security object to the login management service.

Upon receiving the contact information and the security object, the login management service may use the received security object to validate that the contact information matches a user/user device that is registered to access the application/service. In some examples, the validation may include looking up the device information mapped to the security object to verify that the contact information matches information corresponding to the device information. If the user or user device is registered, the login management service may authenticate the user device and the user device may access the application/service. If the user or user device is not registered, the login management service may notify the user that the authentication process has failed and/or initiate a registration process.

Accordingly, the present disclosure provides a plurality of technical benefits including but not limited to: decreasing the communication costs associated with authenticating devices, decreasing the amount of communication failures during the authentication process, decreasing the amount of manual data entry and user interaction required during the authentication process, and eliminating/decreasing the technical hurdles associated with variant communication protocols and encodings between software and hardware platforms, among other examples.

Figure 5:
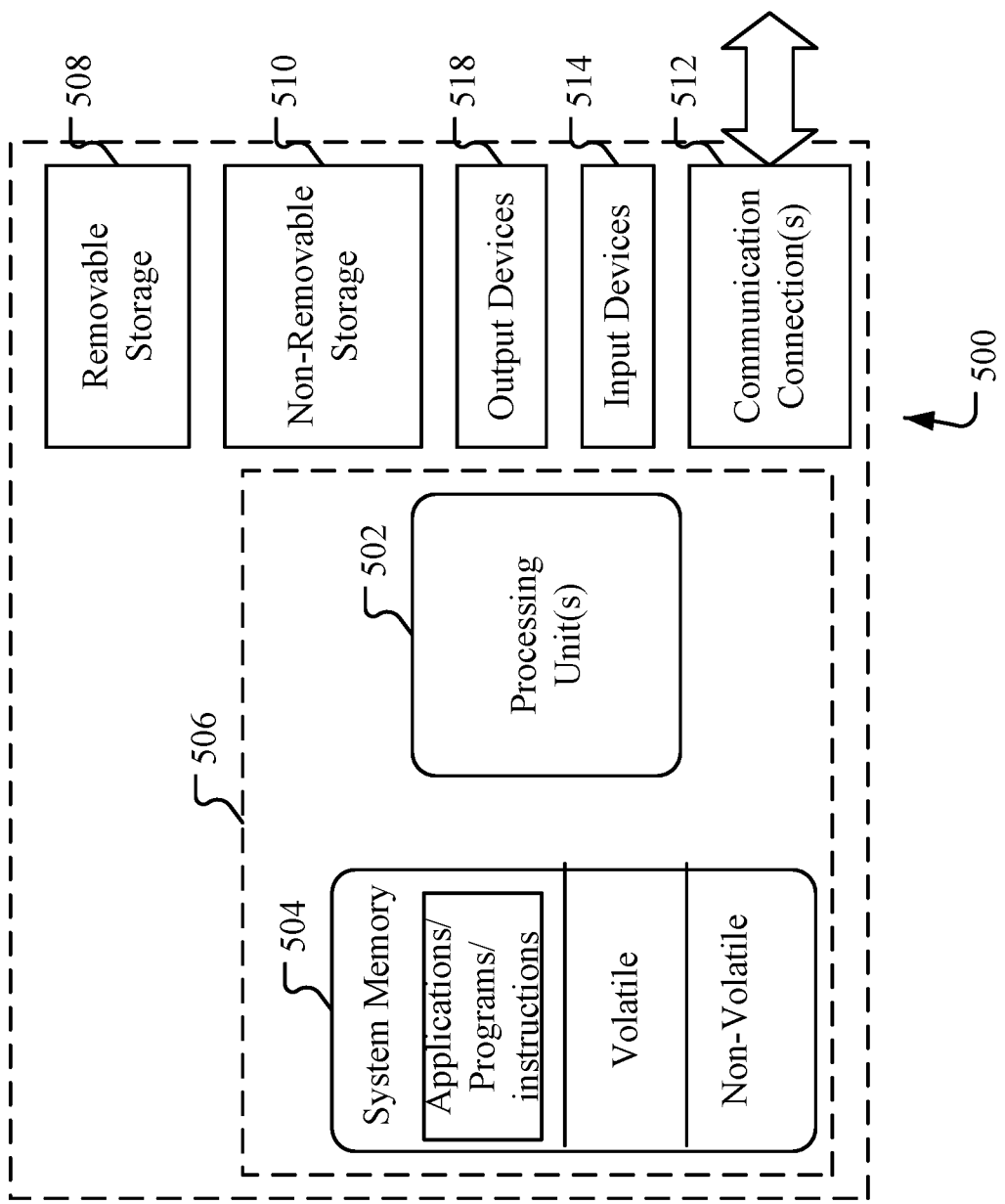
FIG. 5 illustrates one example of a suitable operating environment in which one or more of the present embodiments may be implemented.

FIG. 1 illustrates an overview of an example system for automated user authentication via phone call. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, system 100 may provide an operating environment for software components to execute and utilize resources or facilities of system 100. An example of one or more processing devices comprising such an operating environment is depicted in FIG. 5. In another example, the components of systems disclosed herein may be distributed across multiple devices. For instance, input may be entered on a user device or client device and information may be processed on or accessed from other devices in a network, such as one or more remote cloud device or web server devices.

In FIG. 1, system 100 comprises user devices 102A, 102C, and 102C (collectively "user device(s) 102"), network 104, computing device 106, and service provider 108. One of skill in the art will appreciate that the scale of systems such as system 100 may vary and may include additional or fewer components than those described in FIG. 1. As one example, system 100 may comprise at least one additional computing device 106.

User device(s) 102 may be configured to detect and/or collect input data associated with user device(s) 102. The input data may correspond to user interaction with one or more software applications or services implemented by, or accessible to, user device(s) 102. The input data may include, for example, voice input, touch input, text-based input, gesture input, video input, and/or image input. The input data may be detected/collected using one or more sensor components of user device(s) 102. Examples of sensors include microphones, touch-based sensors, geolocation sensors, accelerometers, optical/magnetic sensors, gyroscopes, keyboards, and pointing/selection tools. Examples of user device(s) 102 may include, but are not limited to, personal computers (PCs), server devices, mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices.

User device(s) 102 may be further configured to provide one or more portions of the input data and/or additional data to one or more devices or systems via network 104. For example, user device(s) 102 may provide device information of user device(s) 102 to computing device 106 and provide access information for an application or a service to service provider 108. User device(s) 102 may also receive information from the one or more devices or systems via network 104. For example, user device(s) 102 may receive access information for the application or service and/or an authentication determination from computing device 106. Based on the provided and/or received information via network 104, user device(s) 102 may be authenticated to access an application or a service. Examples of network 104 may include a private area network (PAN), a local area network (LAN), a wide area network (WAN), and the like. Although network 104 is depicted as a single network, it is contemplated that network 104 may represent several networks of similar or varying types.

Computing device 106 may be configured to provide sign up and/or login management services for an application or a service. The management services may enable collecting and/or storing user registration information for one or more users or user device(s) 102. The registration information may comprise, for example, device identifiers, phone numbers, IP addresses, user identifiers, user account information, user activity history, user preference information, device configuration information, etc. The management services may also enable generating and storing a security object based on input data and/or additional data received from user device(s) 102. Examples of a security object may include a security token, a security key, a security code, a digital certificate, and a one-time password (OTP), among others. The security object may be mapped to a current communication session between computing device 106 and user device(s) 102. Access information for accessing the application/service may be generated/selected and provided along with the security object to user device(s) 102.

Computing device 106 may be further configured to provide security object validation and user authentication. The management services may further enable validating a received security object that is correlated to a current communication session between computing device and user device(s) 102. The security object may be validated by searching a data store of, or accessible by, computing device 106 for stored contact information that matches contact information received with the security object. If a match between the stored contact information and the received contact information is found, computing device 106 may authenticate a user or user device(s) 102. Computing device 106 may provide an indication of the authentication to user device(s) 102.

Service provider 108 may be configured to provide one or more communication interfaces for establishing communication sessions between users. The communication interface may enable various forms of communication, such as phone calls, videoconferencing, email, SMS, etc. To establish a communication session, an access object comprising, for example, access information (e.g., a phone number, an Internet Protocol (IP) address, a hyperlink) and a security object may be required by the communication interface. Upon receiving the access object, the communication interface may attempt to contact a recipient device using the access information.

Service provider 108 may be further configured to provide access to a communication session trigger mechanism. The trigger mechanism may be incorporated into service provider 108 or may access service provider 108 remotely from another device (not pictured). The trigger mechanism may monitor incoming communication session requests directed to one or more recipient devices. Upon detecting such a communication session request, the trigger mechanism may extract the security object from the communication session request and collect contact information from the device that sent the communication session request. The trigger mechanism may provide the contact information and extracted security object to computing device 106.

Figure 2:
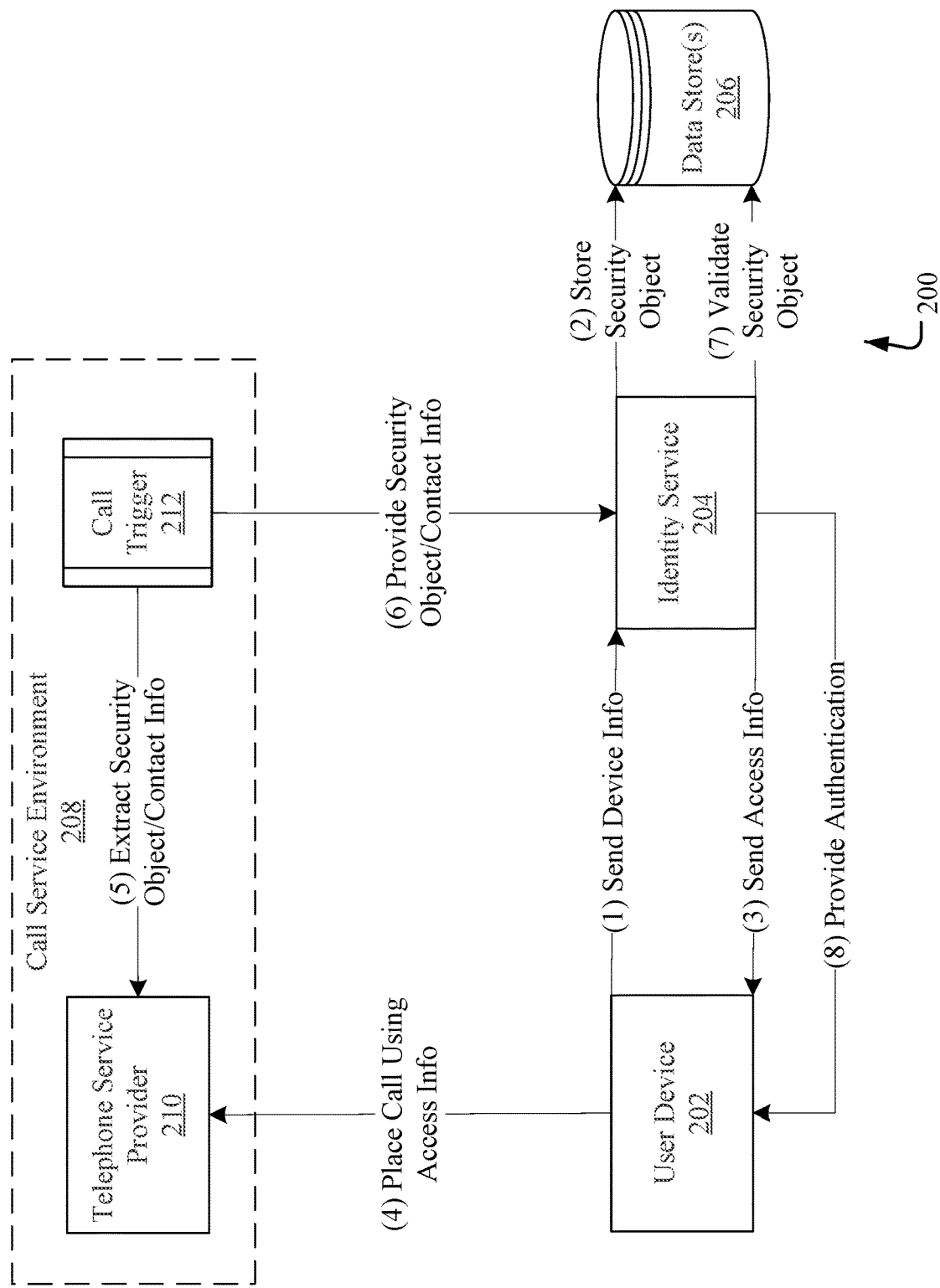
FIG. 2 illustrates an example process flow for automated user authentication via phone call.

FIG. 2 is a diagram of an example an example process flow for automated user authentication via phone call. Example process flow 200, as presented, comprises user device 202, identity service 204, data store(s) 206, call service environment 208, telephone service provider 210, and call trigger mechanism 212. One of skill in the art will appreciate that the scale of systems such as system 200 may vary and may include more or fewer components than those described in FIG. 2.

In FIG. 2, user device 202 may represent a user device, as described with respect to user device(s) 102 of FIG. 1. User device 202 may be installed with one or more applications/services. Alternatively, one or more applications/services may be located and/or implemented externally to user device 202. In examples, a user may access or initiate an application/service by interacting with user device 202. Accessing or initiating the application/service may cause a communication session between the application/service and identity service 204 to be established or activated. Identity service 204 represent a sign up and/or login management services for the application/service, as described with respect to computing device 106 of FIG. 1. The communication session may utilize an interface (such as an API) that is exposed by the application/service or is otherwise accessible to user device 202.

User device 202 may transmit device information to identity service 204 during the communication session. The device information may include at least a unique device identifier and geolocation information for user device 202. Identity service 204 may use the device information to generate a security object corresponding to the unique device identifier and/or communication session. In some examples, the security object may be generated randomly. For instance, the security object may be an autogenerated numeric, alphanumeric, alphabetic value that is based on auto-incrementation, random number generation, system jitter, or other factors. In other examples, the security object may be generated based on the device information and/or additional information, such as the current date/time, the date/time the communication session was created, the communication session identifier, a user identifier, etc. For instance, the IMEI of the user device 202 and/or the timestamp associated with the creation of the communication session may be used to create a specific value. In either example, a hash function, encryption algorithm, or a similar obfuscation mechanism may be applied to the value to secure the security object.

When the security object is generated, identity service 204 may assign a set of expiration conditions to the security object. The set of expiration conditions may comprise one or more expiration conditions. An expiration condition may be time-based, event-based, or some combination thereof. For instance, a first expiration condition may dictate that a security object is to expire when a certain amount of time has lapsed (e.g., 5 minutes) and a second expiration condition may dictate that security object is to expire when the communication session has ended. When any expiration condition in a set of expiration conditions is satisfied, the security object may be expired, invalidated, removed, or otherwise made inoperable. In at least one example, the expiration of the security object may cause the communication session to be terminated.

After the security object has been generated, identity service 204 may store the security object such that the security object is correlated to user device 202 and/or the communication session. For instance, identity service 204 may comprise or have access to data store(s) 206. Data store(s) 206 may represent one or more databases, database tables, file systems, file directories, flat files, virtualized storage systems, and/or the like. Data store(s) 206 may comprise previously collected user and/or device information for users/user devices registered or otherwise permitted (currently or previously) to access the application/service being interacted with by user device 202. For instance, data store(s) 206 may comprise user information (e.g., name, account identifier, address, user account information), device information (identifier, model, hardware/software profile, phone number/IP address, geolocation data), activity history (e.g., communication session dates and durations, activities performed, purchase history, search history). Identity service 204 may store the security object, an identifier of the current communication session, and a device identifier of user device 202 in data store(s) 206 (e.g., in a table/file for currently active communication sessions).

Identity service 204 may select access information for accessing an automated communication interface associated with the application/service. The access information may be selected based in part on the device information. For instance, identity service 204 may use the current GPS coordinates of user device 202 (provided in the device information) to identify a current geographic region/location of user device 202. Based on the geographic region/location, identity service 204 may select, for example, an optimal phone number or IP address for accessing the application/service from the geographic region/location. The optimal phone number or IP address may correspond to an access method for which the user does not incur (or incurs minimal) expense (e.g., a toll-free phone number) or an access method that provides the shortest or fastest pathway between user device 202 and the automated communication interface (e.g., least amount of network hops, least latency).

Identity service 204 may provide the access information and the security object to user device 202. In some examples, identity service 204 may combine the access information and the security object into a single access information object. For instance, the security object may be appended or otherwise affixed to the access information to form a single character string. Identity service 204 may provide the access information object to user device 202. In other examples, identity service 204 may separately provide the access information and the security object to user device 202 in one or more transmission transactions.

After establishing a communication session between user device 202 and identity service 204, user device 202 may receive or detect an authentication request for the application/service. The authentication request may represent a request from the user of user device 202 to access the application/service. In examples, the authentication request may be provided via user input (e.g., selection of a UI element, issuing a voice command, issuing haptic input) received by user device 202. In response to the authentication request, user device 202 may request access information from identity service 204. Alternatively, identity service 204 may have previously provided the access information automatically to user device.

After receiving the authentication request, user device 202 may provide the access information to call service environment 208. Service environment 208 may comprise telephone service provider 210 and call trigger mechanism 212. Telephone service provider 210 may provide the automated communication interface associated with the application/service, as discussed with respect to service provider 108. Telephone service provider 210 may use the access information to establish a communication session between user device 202 and the automated communication interface. In some examples, the communication session between user device 202 and the automated communication interface may be terminated automatically by the automated communication interface upon (or soon after) establishing the communication session. Terminating the communication session in this manner may prevent user device 202 from incurring a service cost for the communication session.

During or upon termination of the communication session between user device 202 and the automated communication interface, call trigger mechanism 212 may detect the authentication request for the application/service. Call trigger mechanism 212 may represent a software engine, software code, or a similar software component that is used as an event handler for the application/service. Call trigger mechanism 212 may be configured detect and process any authentication request for the application/service that is received by the automated communication interface. Upon detecting the authentication request for the application/service, call trigger mechanism 212 may extract the security object from the access information received by telephone service provider 210. The extracting may include the use of one or more pattern matching services or utilities, such as regular expressions, fuzzy logic, pattern recognition models, etc. Call trigger mechanism 212 may also extract the contact information for user device 202. For instance, call trigger mechanism 212 may identify and extract the phone number or IP address for user device 202 from the automated communication interface, a caller ID log, or other communication session data. Call trigger mechanism 212 may provide the security object and the contact information for user device 202 to identity service 204.

Identity service 204 may validate the security object received from call trigger mechanism 212. Validating the security object may comprise ensuring that the security object is mapped to an active communication session. For example, identity service 204 may search data store(s) 206 for an entry that matches the security object. In response to the search, identity service 204 may determine that the security object is currently mapped to an active communication session for user device 202. If identity service 204 determines that the security object cannot be validated (e.g., an active communication session is not found for the security object), identity service 204 may terminate the authentication request and/or provide an indication that the authentication request to user device 202. However, if identity service 204 determines that the security object can be validated, identity service 204 evaluate the contact information for user device 202.

After validating the security object, identity service 204 may use the contact information for user device 202 to determine whether the user of user device 202 is registered or authorized to access the application/service. For example, identity service 204 may search data store(s) 206 for an entry that matches the contact information. If no entry matching the contact information is found in data store(s) 206, identity service 204 may provide registration instructions to, or initiate a new registration process for, the user of device 202. However, if an entry matching the contact information is found in data store(s) 206, identity service 204 may authenticate the user of device 202 or enter an authentication process (e.g., two-factor authentication, multi-factor authentication, single sign-on). Upon authentication of the user of device 202, identity service 204 may provide an indication of successful authentication to user device 202. For example, identity service 204 may open the application/service or requested functionality thereof.

Having described various systems that may be employed by the aspects disclosed herein, this disclosure will now describe one or more methods that may be performed by various aspects of the disclosure. In aspects, methods 300-400 may be executed by a system, such as system 100 of FIG. 1. However, methods 300-400 are not limited to such examples. In other aspects, methods 300-400 may be performed by a single device or component that integrates the functionality of the components of system 100. In at least one aspect, methods 300-400 may be performed by one or more components of a distributed network, such as a web service/distributed network service (e.g. cloud service).

Figure 3:
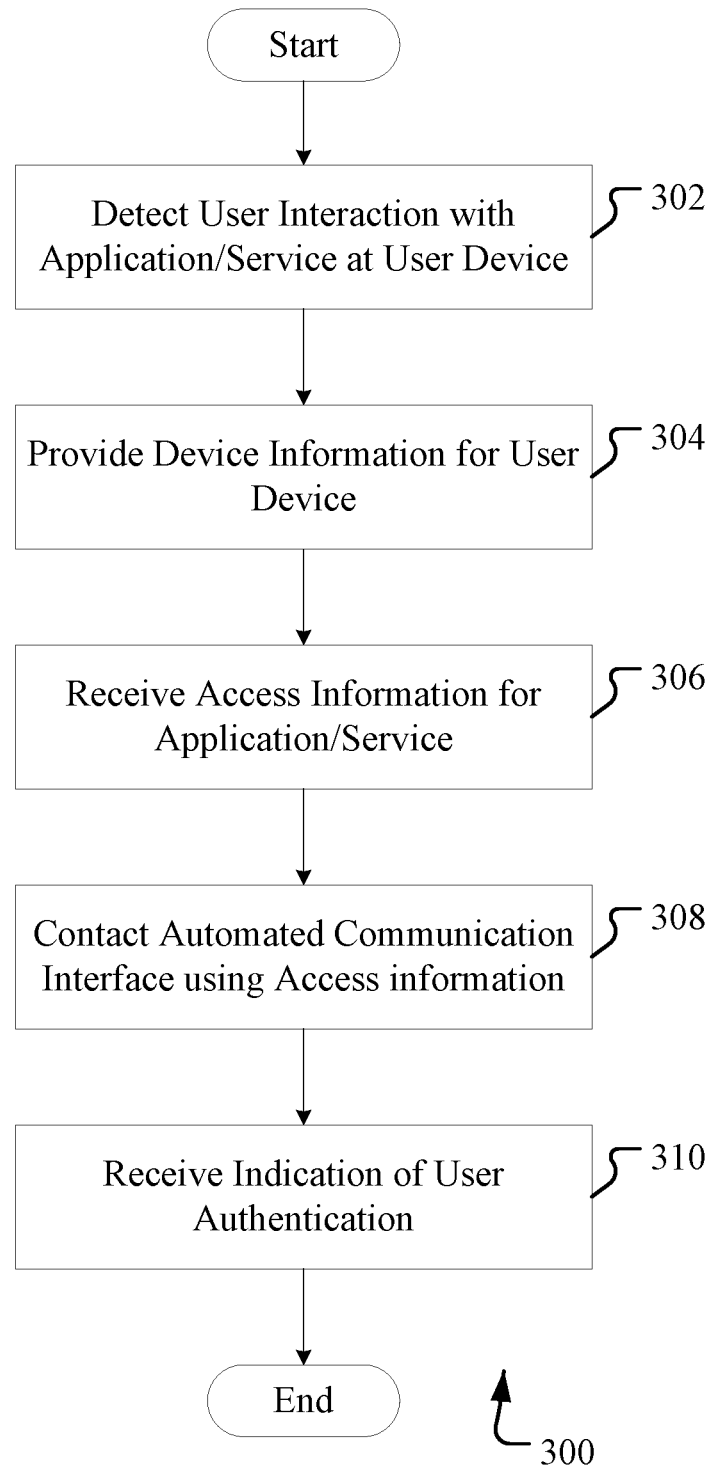
FIG. 3 illustrates an example method for automated user authentication via phone call.

FIG. 3 illustrates an example method for automated user authentication via phone call. Example method 300 may be executed by a user device or a client device, such as user device 202, among other examples. Example method 300 begins at operation 302, where user interaction is detected by a user device. In aspects, a user device may provide access to an application or a service. A user may use the user device to request access to the application/service. For example, the user may launch the application/service from the user device in response to direct action by the user (e.g., user selection of a launch icon/button for the application/service). In another example, the application/service may launch in response to indirect action by the user. Indirect action user action may include the user arriving at a particular destination or a geo-fenced area, the user providing content to a different application/service, or the user receiving a communication comprising actionable content, among others. For instance, a user may send an acquaintance an SMS message indicating that the user will be departing for the acquaintance's current location in 20 minutes. The user device may process the text message using one or more machine learning techniques to determine the user's intent to travel and a travel destination. Based on the processing of the text message, the user device may automatically open a ride-hailing application to enable the user to schedule a ride that will accommodate the 20-minute departure timeframe. In yet another example, the application/service may launch based on no current action by the user. For instance, the application/service may be launched at a particular date/time, after an amount of time has elapsed, based on previous user activity, based on scheduled user event (e.g., a meeting, an appointment, a reminder), etc.

At operation 304, device information of the user device may be provided. In aspects, in response to detecting the user interaction, a communication session may be established between the user device and an identity management device, such as identity service 204. The user device may provide device information of the user device to the identity management device. The device information may comprise at least a device identifier and current location information for the user device. For example, the user device may provide to the identity management device a POST method comprising an IMEI of the user device and GPS coordinates of the user device at the time the communication session was established.

At operation 306, access information for the application/service may be received. In aspects, the user device may receive an access information object from the identity management device. The user device may receive the access information object from the identity management device without an explicit user request. For example, the identity management device may automatically provide the access information object in response to receiving the device information or in response to establishing the communication session. Alternatively, the user device may receive an authentication request from a user. For example, a user may provide a user request to access to the application/service (or functionality thereof) by selecting a button/control on, or providing a voice command to, a user interface of the application/service. The user device may retrieve the access information object from the identity management device in response to the user request.

The access information object may comprise access information and/or a security object. The access information may be or comprise a phone number or an IP address that corresponds to the current geolocation of the user device. For example, the access information may comprise a toll-free phone number that may be used to access or authenticate a user from the current geolocation of the user device. The security object may be or comprise a security token or security code that has been assigned to the user device and/or the communication session between the user device and the identity management device. The security object may be based on the device information of the user device and may be valid for the duration of the communication session. For example, the security object may be a unique token comprising a numeric value that represents a hashed or encrypted value of the IMEI of the user device. The security object may be appended or otherwise affixed to or included in the access information. For example, the access information object may comprise a phone number, one or more delimiters appended to the phone number, and a unique token appended to the delimiter(s) (e.g., <phone number><delimiter><unique token>).

At operation 308, the access information object may be used to contact an automated communication interface for the application/service. In aspects, the user device may provide the access information object to an automated communication interface of a service provider, such as telephone service provider 210. In response, the service provider may establish a communication session between the user device and the automated communication interface. For example, the user device may place a phone call to a service provider using a single character string that comprises a phone number and a security object that is provided as an extension to the phone number. In another example, the user device may place a phone call to a service provider using multiple character strings. For instance, the user device may provide a phone number to the service provider. In response to a prompt for additional information by the service provider or the automated communication interface, the user device may provide the security object. In either example, the service provider may complete the phone call by connecting the user device to the automated communication interface.

The automated communication interface may comprise or be accessible by a communication detection component, such as call trigger mechanism 212. In response to establishing the communication session between the user device and the automated communication interface, the communication detection component may extract the security object from the access information and collect contact information for the user device. The contact information may include a phone number, an IP address, or other communication enabling information of the user device. The communication session may then be terminated. Alternatively, the communication session may be terminated immediately after (or soon after) the communication session has been established. The communication session data (e.g., comprising access information, contact information, and communication session metrics) may be logged and/or provided to the communication detection component. The communication detection component may extract the security object and the contact information from the communication session data.

At operation 310, an indication of user authentication may be received. In aspects, the user device may receive a validation indicator from the identity management device. The validation indicator may provide an indication of whether the identity management device was able to validate the security object. If the validation indicator indicates that the security object could not be validated, the communication session between the user device and the identity management device may be terminated and the user may not be permitted access to the application/service.

In addition to, or alternatively to, receiving the validation indicator, the user device may receive an authentication indicator from the identity management device. The authentication indicator may provide an indication of whether the identity management device was able to determine that the user of the user device is registered or authorized to access the application/service. If the authentication indicator indicates that the user is registered or authorized to access the application/service, the user device may be provided access to the application/service or the requested functionality thereof. If the authentication indicator indicates that the user is not registered or authorized to access the application/service, the user device may be provided user registration instructions, or a registration process may be initiated on the user device. For instance, the user device may be automatically directed to a new user registration webpage for the application/service. In some aspects, after completion of the user registration process, the user device may be provided access to the application/service or the requested functionality thereof.

Figure 4:
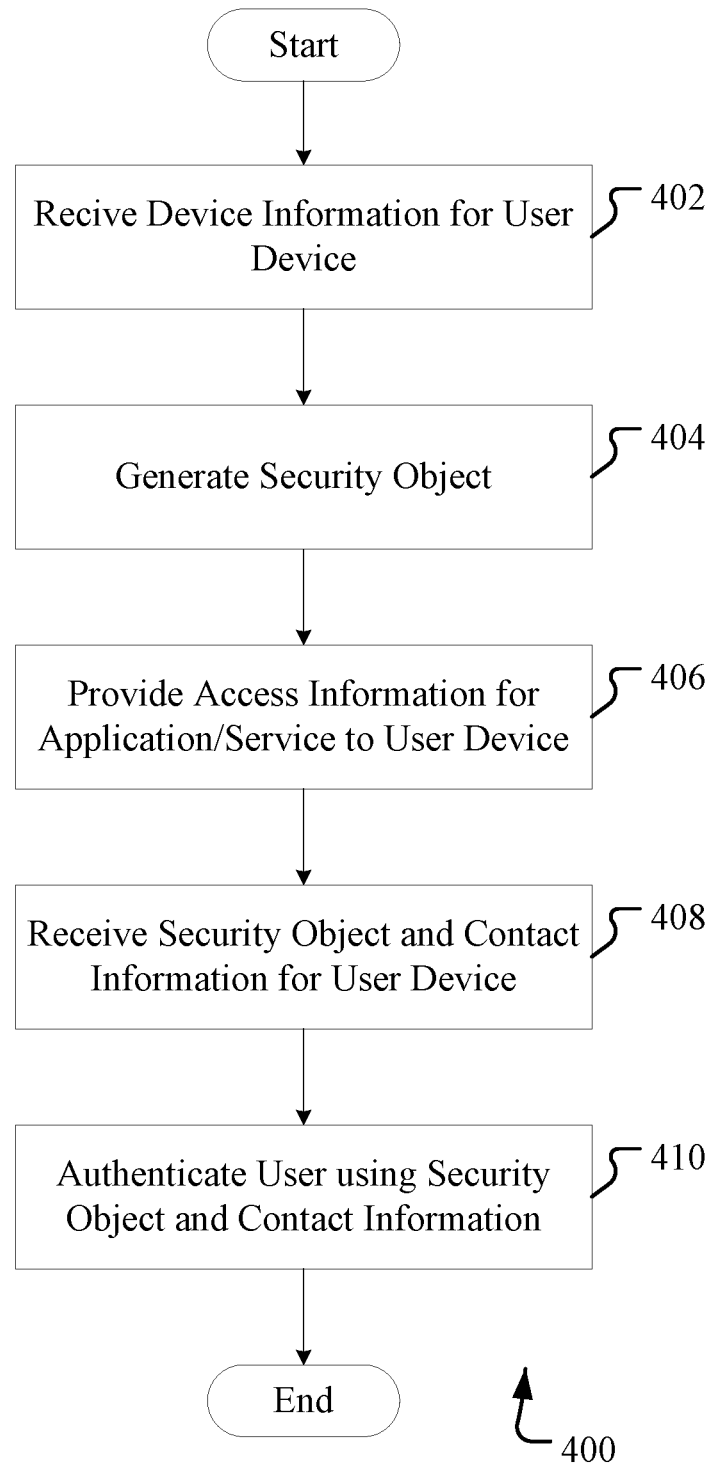
FIG. 4 illustrates an alternative example method for automated user authentication via phone call.

FIG. 4 illustrates an example method for automated user authentication via phone call. Example method 400 may be executed by an identity management service or device, such as identity service 204, among other examples. Example method 400 begins at operation 402, where device information is received by an identity management device. In aspects, an identity management device that provides sign up and/or login management services for an application or a service may receive device information of a user device. The device information may be transmitted to the identity management device in response to detected user interaction with the application/service on the user device. The device information may comprise at least a device identifier and current location information for the user device.

At operation 404, a security object may be generated. In aspects, the identity management device may generate a security object. The security object may be generated using a technique for creating randomly generated values or strings. Alternatively, the security object may be generated based on the device information. For example, the identity management device may extract one or more information items from the device information, such as device identifier, current location of the user device, the current date/time, the date/time the communication session was created, the communication session identifier, a user identifier, etc. A hash function, encryption algorithm, or a similar obfuscation mechanism may be applied to the information item(s) to generate one or more values. The generated value(s) may be, represent, or be added to the security object.

The identity management device may map the security object to the user device and/or a current communication session between the user device and the identity management device. The identity management device may store the mapped information in an identity data store, such as data store(s) 206. For example, the mapped information may be stored in a first database table such that the security object is the primary key for a table row comprising the security object, the device identifier, and the communication session identifier.

At operation 406, access information for the application/service may be provided. In aspects, the identity management device may identify access information for the user device. Identifying the access information may include using the device information and/or additional information associated with the user device to determine a location of the user device. As one example, the identity management device may determine a location corresponding to geolocation data, such as GPS coordinates, in the device information. As another example, the identity management device may determine a location based on geographic indicators (e.g., area code, country code, IP address) associated with the user device. The geographic indicators may be dynamically collected from the user device and/or collected from previously collected information. For instance, the identity management device may store previously collected registration information for the user device. The registration information may comprise one or more geographic indicators. The identity management device may use the geographic indicators for the user device to identify a corresponding location (e.g., via a location-based lookup utility).

In some examples, the identity management device may identify access information for the determined location based on the determined location of the user device. The identity management device may select an optimal access method (e.g., phone number, IP address, or other access means) for accessing the application/service from the determined location. The optimal access method may correspond to an access method for which the user does not incur (or incurs minimal) expense (e.g., a toll-free phone number, a local phone number) or an access method that provides the shortest or fastest pathway (e.g., least amount of network hops, least latency) between a user device and a destination device. In other examples, the identity management device may select a default access method for accessing the application/service. The default access method may not be based on the determined location and may be used by all (or nearly all) of the user devices that attempt to access the application/service.

In at least one aspect, the identity management device may combine the access information and the security object into a single access information object. For example, the security object may be appended or otherwise affixed to or included in the access information. The access information object may be a character string (or other data type) that is numeric, alphanumeric, or alphabetic. A hash function, encryption algorithm, or a similar obfuscation mechanism may be used to secure the access information object. The identity management device may provide the access information object (or the access information and the security object) to the user device.

At operation 408, the security object and contact information for the user device may be received. In aspects, the identity management device may receive the security object and contact information for the user device from a communication detection component, such as call trigger mechanism 212. The contact information may include a phone number of the user device, an IP address of the user device, or other user device identifying information. The identity management device may validate that the security object is mapped to an active communication session. For example, the identity management device may search the first database table for an entry corresponding to the security object. If no entry matching the security object is found in the first database table, the communication session between the user device and the identity management device may be terminated.

At operation 410, the user device may be authenticated to access the application/service. In aspects, if an entry matching the security object is found in the first database table, the identity management device may search a second database table in the identity data store to determine whether the user of the user device is registered or authorized to access the application/service. The second database table may comprise previously collected registration information for the user, such as device identifiers, phone numbers, IP addresses, user identifiers, user account information, user activity history, user preference information, device configuration information, etc. For example, the identity management device may search the second database table for an entry corresponding to the received contact information. If an entry matching the contact information is found in the second database table, the user may be authenticated to access the application/service and/or an indication of authentication may be provided to the user device. If no entry matching the contact information is found in the second database table, user registration instructions may be provided to the user device. Alternatively, the identity management device may cause a registration process to be initiated on the user device. The registration process may enable the user to access to the application/service.

FIG. 5 illustrates an exemplary suitable operating environment for the techniques described in FIG. 1. In its most basic configuration, operating environment 500 typically includes at least one processing unit 502 and memory 504. Depending on the exact configuration and type of computing device, memory 504 (storing, instructions to perform the techniques disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections 512, such as LAN, WAN, point to point, etc. In embodiments, the connections may be operable to facility point-to-point communications, connection-oriented communications, connectionless communications, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A device comprising:
 a processor; and
 memory coupled to the processor, the memory comprising computer executable instructions that, when executed by the processor, performs a method comprising:
  detecting user interaction associated with an application;
  in response to detecting the user interaction, providing device information of the device to an identity management service;
  receiving, from the identity management service, access information for accessing the application, the access information comprising at least a security object;
  using the access information to perform a phone call to an automated communication interface of the application;
  receiving an indication of authentication for the application based on validation of the security object; and
  based on the indication of authentication, providing access to the application.

2. The device of claim 1, wherein the user interaction corresponds to initiating the application by direct user action or indirect user action, the initiating the application causing a communication session to be established between the device and the identity management service.

3. The device of claim 2, wherein the direct user action corresponds to a user entering user input into an interface of the application.

4. The device of claim 2, wherein the indirect user action corresponds to at least one of:
arriving at a geolocation;
providing user input to a different application or service; or
receiving a communication comprising actionable content.

5. The device of claim 2, wherein the security object expires when the communication session or after an amount of time elapses.

6. The device of claim 1, wherein the security object is a security token or a security code.

7. The device of claim 1, wherein the device information comprises at least one of:
a device identifier for the device; or
geolocation information for the device.

8. The device of claim 1, wherein the access information further comprises at least one of a phone number or an IP address.

9. The device of claim 8, wherein the phone number or the IP address is selected based on a geolocation of the device.

10. The device of claim 1, wherein the security object is generated based on the device information.

11. The device of claim 1, wherein the security object is a numeric value that is generated using a hash function or an encryption algorithm.

12. The device of claim 1, wherein using the access information to perform the phone call to the automated communication interface of the application comprises using the access information to initiate the phone call via a phone service provider in order to establish a communication session between the device and the automated communication interface.

13. The device of claim 12, wherein the communication session is automatically terminated upon being established such that the device does not incur a service cost for the communication session.

14. The device of claim 1, wherein the automated communication interface comprises:
functionality for extracting the security object from the access information; and
functionality for collecting contact information of the device.

15. The device of claim 1, the method further comprising:
in response to receiving the indication of authentication, initiating a registration process.

16. The device of claim 1,
wherein the registration process enables a user of the device to register for access to the application.

17. A method comprising:
receiving, at a computing device, device information of a mobile device, the computing device providing an identity management service for an application accessible using the mobile device;
providing, by the computing device to the mobile device, access information for accessing the application, the access information comprising a security object and at least one of a phone number or an IP address;
receiving, at the computing device, the security object from an automated communication interface for the application that received a phone call from the computing device;
validating, by the computing device, the security object; and
in response to validating the security object, authenticating a user of the mobile device to enable the mobile device to access the application.

18. The method of claim 17, wherein the security object is provided as an extension to the phone number or the IP address.

19. The method of claim 17, wherein the security object is a one-time password.

20. A system comprising:
a processor; and
memory coupled to the processor, the memory comprising computer executable instructions that, when executed by the processor, performs a method comprising:
detecting, at a mobile device, user interaction associated with an application accessible using the mobile device;
in response to detecting the user interaction, providing device information of the mobile device to an identity management service associated with the application;
receiving, at the mobile device, a user request to access the application;
in response to receiving the user request, receiving, at the mobile device, access information for accessing the application, the access information comprising a security object and at least one of a phone number or an IP address;
using the access information to perform, from the mobile device, a phone call to an automated communication interface of the application;
receiving, at the mobile device, authentication to access the application based on a validation of the security object; and
based on the authentication, accessing the application from the mobile device.

* * * * *